United States Patent [19]
Yamauchi et al.

[11] 3,867,682
[45] Feb. 18, 1975

[54] BATTERY CHARGER WITH MEANS FOR PREVENTING OVERCHARGING OF THE BATTERY

[75] Inventors: Hiroyuki Yamauchi, Tokyo; Masahiro Ohya, Kawasaki, both of Japan

[73] Assignee: Sony Corporation, Tokyo, Japan

[22] Filed: Oct. 23, 1973

[21] Appl. No.: 408,536

[30] Foreign Application Priority Data
Nov. 20, 1972 Japan.............................. 47-116326

[52] U.S. Cl. ............................. 320/39, 320/DIG. 2
[51] Int. Cl. ................................................. H02j 7/10
[58] Field of Search ............ 320/39, 40, 20, DIG. 1, 320/DIG. 2

[56] References Cited
UNITED STATES PATENTS

| | | | |
|---|---|---|---|
| 3,296,515 | 1/1967 | Knauth | 320/DIG. 2 X |
| 3,531,706 | 9/1970 | Mullersman | 320/39 X |
| 3,576,487 | 4/1971 | Chase | 320/39 |
| 3,602,794 | 8/1971 | Westhaver | 320/39 |

Primary Examiner—J. D. Miller
Assistant Examiner—Robert J. Hickey
Attorney, Agent, or Firm—Hill, Gross, Simpson, Van Santen, Steadman, Chiara & Simpson

[57] ABSTRACT

A battery charger is provided with means to prevent overcharging of the battery. The battery is connected in series with a thyristor across a pulsating voltage source. One side of the voltage source and the cathode side of the thyristor is grounded. Circuit means is provided which measures the voltage of the battery side of the thyristor with respect to ground when the pulsating voltage from the source becomes substantially zero. When the pulsating voltage from the source becomes zero, the thyristor goes off and the voltage above ground at the connection point between the battery and the thyristor is the no-load voltage of the battery. A reference voltage is provided. When the voltage at the connection point reaches the reference voltage, a control signal is supplied to the thyristor control to keep the thyristor shut off, which in turn prevents further charging of the battery.

6 Claims, 10 Drawing Figures

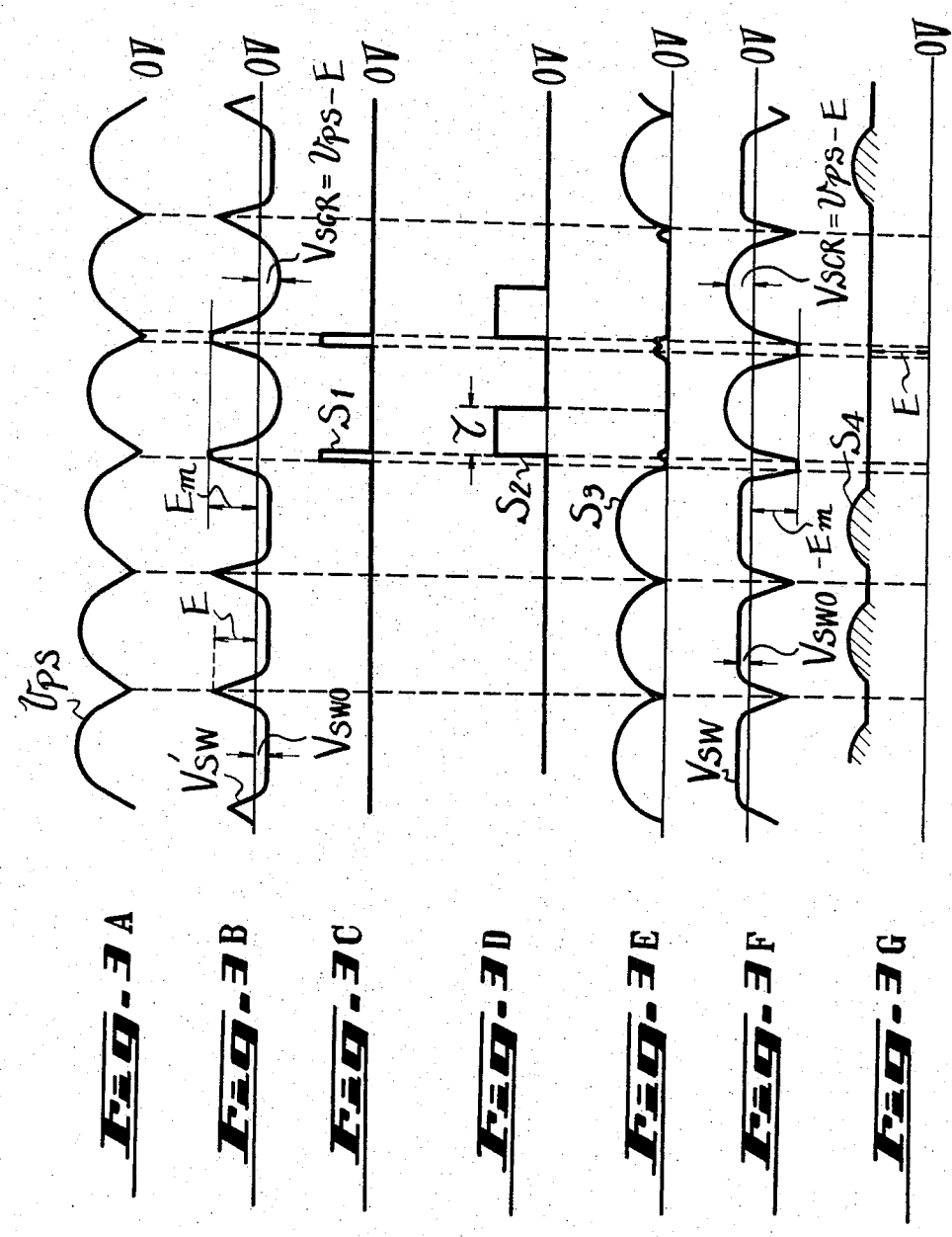

3,867,682

BATTERY CHARGER WITH MEANS FOR PREVENTING OVERCHARGING OF THE BATTERY

BACKGROUND OF THE INVENTION

1. Field of the Invention

This invention relates generally to a battery charger for charging a rechargeable battery, and more particularly to an improved charging circuit in which the charging of the battery is automatically stopped with the detection of the fully charged voltage of the battery.

In the field of a battery charger for rechargeable batteries or storage batteries, for example, a nickel-cadmium battery, it is known to enhance the efficiency of the charging and to reduce the charging time by using a pulsating voltage as a charging power source. In such a case, care must be taken to prevent over-charging of the battery and for this purpose it is required to correctly detect the time when the battery has been fully charged and to stop the charging of the battery after that time. This time is obtained by detecting the terminal voltage of the battery at a point of time between charging pulses and to cause the battery charger to be turned off when this battery terminal voltage has just reached a value which represents the fully charged state for each batteries.

The reason for detecting or measuring the open terminal voltage to obtain the timing of the fully charged state of the battery is mentioned as follows. Generally speaking, when the charging of a battery stops, there is a tendency for the terminal voltage of the battery to decrease exponentially until it settles at the true terminal voltage. Accordingly, in the case that the terminal voltage of the battery during a charging period is detected or measured, the true terminal voltage can not be obtained and it is feared that even though the battery is not charged sufficiently, the charging of the battery is stopped.

2. Description of the Prior Art

To be able to detect the open terminal voltage when the battery has just reached its fully charged state and to stop the charging after the detected moment, it has been proposed to provide a switching device connected in series with the battery to be charged which are then connected to a pulsating voltage source for supplying a pulsating current to the battery through the switching device. In such a construction, the switching device is made non-conductive so as to stop the supply of the pulsating current to the battery after the time when the terminal voltage of the battery during a period when the pulsating voltage of the pulsating voltage source is substantially zero has just reached the voltage representing a fully charged condition. In this case, the terminal voltage of the battery during the period when the pulsating voltage is substantially zero shows the open terminal voltage because at such a period the charging of the battery is not peformed.

There has been proposed various charging circuits to achieve the above mentioned battery charging. These circuits, however, require a comparing circuit for comparing the open terminal voltage with a reference voltage corresponding to the fully charged voltage of the battery and a separate timing circuit for producing a timing pulse at the period when the pulsating voltage is substantially zero to control the comparing circuit therewith. Such arrangements in the past have been very complicated.

SUMMARY OF THE INVENTION

An object of the present invention is to provide a battery charger which effectively charges a battery and avoids the over-charging of the battery with a simplified circuit construction.

Another object of the present invention is to provide a battery charger which has a simplified control circuit to stop the charging of the battery automatically at the time when the battery has been fully charged and keep the charging current shut off thereafter in order to avoid the over-charging of the battery.

BRIEF DESCRIPTION OF THE DRAWINGS

FIGS. 3A to 3G are schematic waveform diagrams used for explanation of the operation of the circuit shown in FIG. 2.

DESCRIPTION OF THE PREFERRED EMBODIMENTS

Figure 1:
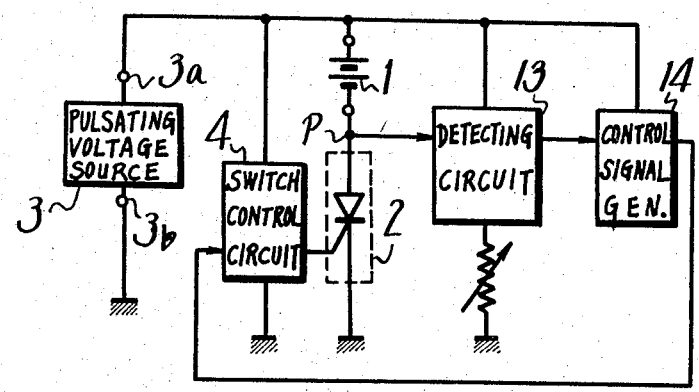
FIG. 1 is a schematic diagram illustrating the essential components of the present invention.

FIG. 1 shows a fundamental circuit of a battery charger made in accordance with the present invention. A series connection of a battery 1 which is to be charged and a switching device 2 having a control terminal, for example, a semiconductor thyristor such as a silicon controlled rectifier (SCR) as shown in the figure, is connected between both terminals $3a$ and $3b$ of a pulsating voltage source 3. A switch control circuit 4 is connected to the control terminal of the switching device, that is, the SCR 2 to control the conductivity of the SCR 2. A detecting circuit 13 is connected to a connecting point P between the battery 1 and the SCR 2 to detect a time when the voltage of the point P during the period when the pulsating voltage from the pulsating voltage source 3 is substantially zero reaches a predetermined value corresponding to the fully charged voltage of the battery 1. Further, a control signal generating circuit 14 is connected between the detecting circuit 13 and the switch control circuit 4 to produce a control signal in response to the output of the detecting circuit 13 and control the switch control circuit 4.

In this circuit, suppose the pulsating voltage is shown as $v_{ps}$ and has a peak value $V_p$, suppose the terminal voltage, that is, the voltage difference between both terminals of the battery 1 is shown as E and suppose voltage of the point P, that is, the voltage across the SCR 2 is shown as $V_{sw}$, the following equation exists.

$v_{ps} = E + V_{sw}$, and therefore, $V_{sw} = v_{ps} - E$. Suppose the SCR 2 keeps the nonconductive state, $V_{sw}$ varying over the range between $V_p - E$ and $-E$ since $v_{ps}$ varies over the range between $V_p$ and zero. Especially, when $v_{ps}$ is zero, $V_{sw}$ equals $-E$ and this $V_{sw}$ indicates the terminal voltage of the battery during the noncharging period, that is, the open terminal voltage of the battery because the SCR is nonconductive. When the SCR is in the conductive state, $V_{sw}$ must be more than zero. Accordingly, when $v_{ps}$ takes the value between zero and E, the SCR must be nonconductive, and therefore the open terminal voltage of the battery 1 is obtained at every cycle of the pulsating voltage by detecting or measuring $V_{sw}$ at a period when the pulsating voltage $v_{ps}$ becomes zero.

In the circuit shown in FIG. 1, the control terminal, that is, the gate of the SCR 2, is supplied with a gate signal in response to the pulsating voltage $v_{ps}$ and the SCR is made conductive at the period when $v_{ps}$ is more than E, and the voltage $V_{sw}$ at the point P is detected and compared with a predetermined reference voltage corresponding to the fully charged voltage of the battery 1 by the detecting circuit 13. In the case that the voltage $V_{sw}$ during the period when the pulsating voltage $V_{ps}$ is zero, reaches the reference voltage, a detected output is produced by the detecting circuit 13 and supplied to the control signal generating circuit 14. The control signal is generated at the circuit 14 in response to the detected output from the detecting circuit 13 and supplied to the switch control circuit 4 to control it so as to make the SCR 2 remain in the nonconductive state regardless of the value of the pulsating voltage $v_{ps}$. As a result, the charging of the battery is stopped and the over-charging of the battery is avoided.

Figure 2:
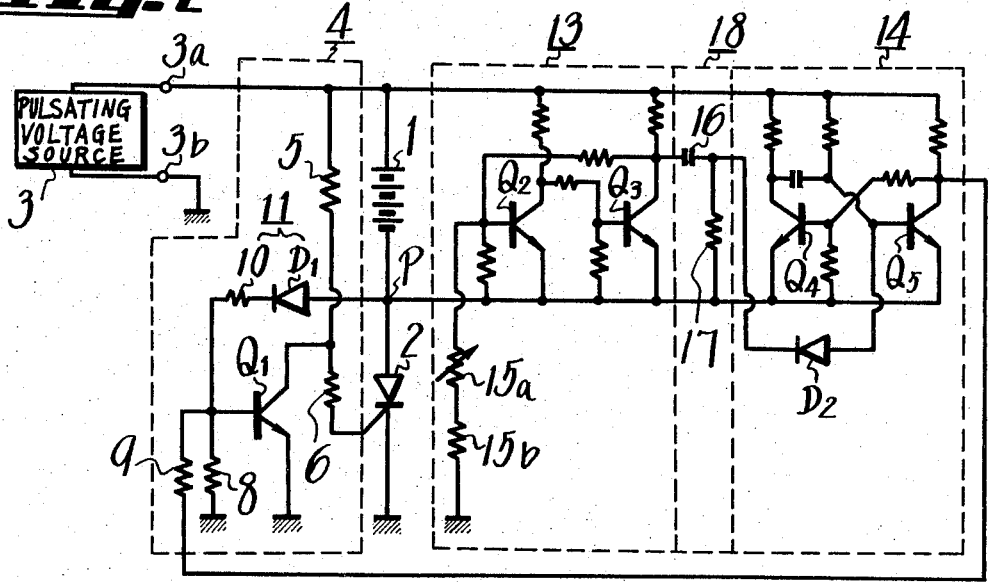
FIG. 2 is a schematic circuit diagram illustrating a preferred embodiment of the present invention.

FIG. 2 shows one example of a preferred circuit of a battery charger in accordance with the present invention. In this circuit, the switch control circuit 4 is composed of a transistor $Q_1$ having a collector connected to one terminal 3a of the pulsating voltage source 3 through a resistor 5 and to the gate of the SCR 2 through a resistor 6, an emitter directly grounded and a base grounded through a resistor 8 and also connected to the control signal generating circuit 14 through a resistor 9. The detecting circuit 13 is composed of a Schmitt trigger circuit formed by transistors $Q_2$ and $Q_3$. The emitters of the transistors $Q_2$ and $Q_3$ are connected to the point P and the base of the transistor $Q_2$ is grounded through a variable resistor 15a and a resistor 15b. The reference voltage for the detecting circuit 13, which corresponds to the fully charged terminal voltage of the battery is varied by controlling the variable resistor 15a. In this Schmitt trigger circuit 13, the terminal voltage of the battery 1 is used as an operating voltage. The control signal generating circuit 14 is composed of a monostable multivibrator formed by transistors $Q_4$ and $Q_5$. This monostable multivibrator utilizes the terminal voltage of the battery 1 as an operating voltage. The collector of the transistor $Q_5$ is connected to the base of the transistor $Q_1$ in the switch control circuit 4. Further, a differentiating circuit 18 consisting of a capacitor 16 and a resistor 17 is connected to the output of the detecting circuit 13 and a connecting point between the capacitor 16 and the resistor 17 is connected to the base of the transistor $Q_5$ forming the monostable multivibrator through a diode $D_2$.

The operation of the circuit of FIG. 2 will be explained in conjunction with FIG. 3 as follows. A pulsating voltage appearing between the terminal 3a and 3b of the pulsating voltage source 3 is shown as $v_{ps}$ in FIG. 3A. This pulsating voltage $v_{ps}$ is supplied to the battery 1 to cause the charging current to flow therethrough and also supplied to the gate of the SCR 2 through the resistors 5 and 6 as a gating signal when the transistor $Q_1$ remains in the non-conductive state. Accordingly, during the interval when the open terminal voltage of the battery does not reach its fully charged voltage, the SCR 2 is made conductive to perform the charging of the battery 1 intermittently at each cycle of the pulsating voltage when the value of the pulsating voltage is more than the terminal voltage of the battery 1. The cathode voltage of the SCR 2 measured on the base of the voltage of the point P is shown as $V'_{sw}$ in FIG. 3B, where the voltage of the point P is indicated as zero. The voltage of the point P measured from the ground is shown as $V_{sw}$ in FIG. 3F, which is equal to the voltage obtained by reversing the voltage $V'_{sw}$. In these figures, $V_{swo}$ indicates the saturating voltage of the SCR 2 and E$m$ (FIG. 3B) or —E$m$ (FIG. 3F) indicates the voltage by which the battery charging should be stopped. When the voltage $V_{sw}$ of the point P becomes lower than the voltage level —E$m$ indicative of the fully charged voltage of the battery 1 at the time when the pulsating voltage $v_{ps}$ is zero, that is, the open terminal voltage E of the battery 1 reaches the fully charged voltage, the transistor $Q_2$ is turned to an on-state from an off-state and therefore the transistor $Q_3$ is turned from an on-state, so a detected output shown as $S_1$ in FIG. 3C is obtained at the collector of the transistor $Q_3$. This detected output $S_1$ is differentiated by the differentiating circuit 18 and a positive pulse and a negative pulse are obtained at the rising edge and the falling edge of the detected output $S_1$, respectively, and the negative pulse is supplied to the base of the transistor $Q_5$ forming the monostable multivibrator through the diode $D_2$. The monostable multivibrator produces a positive control pulse having a pulse $\tau$ shown as $s_2$ in FIG. 2D at the collector of the transistor $Q_5$. This control pulse $S_2$ is supplied to the base of the transistor $Q_1$ in the switch control circuit 4 and the transistor $Q_1$ is turned ON. When the transistor $Q_1$ is made conductive, the gating signal for the SCR 2 is shunted by the transistor $Q_1$ and not supplied to the gate of the SCR 2, so the SCR 2 does not become conductive until the open terminal voltage of the battery becomes less than the fully charged voltage. In this case, the pulse width $\tau$ of the control pulse $S_2$ is selected to less than the width of one wave of the pulsating voltage $v_{ps}$. Further, in the switch control circuit 4, a series connected of a diode $d_1$ and a resistor 10 is connected between the base of the transistor $Q_1$ and point P. When the transistor $Q_1$ is made conductive and therefore the SCR becomes nonconductive, the voltage of the point P increases in response to the pulsating voltage $v_{ps}$, so the diode $D_1$ becomes conductive to apply the voltage of the point P to the base of the transistor $Q_1$ and keep it conductive, and accordingly, the SCR 2 continues to be nonconductive. Thus, the over-charging of the battery 1 is avoided.

If the open terminal voltage of the battery 1 becomes again less than the fully charged voltage, that is, the voltage $v_{sw}$ of the point P becomes higher than the voltage level —E$m$, the control pulse $S_2$ is not generated from the monostable multivibrator and the charging of the battery starts again.

$S_3$ in FIG. 3E indicates the collector voltage of the transistor $Q_1$ measured from the ground and $S_4$ in FIG. 3G indicates the terminal voltage of the battery 1 and portions shaded with slant lines indicate the increased voltage by the charging in excess of the open terminal voltage E.

Figure 4:
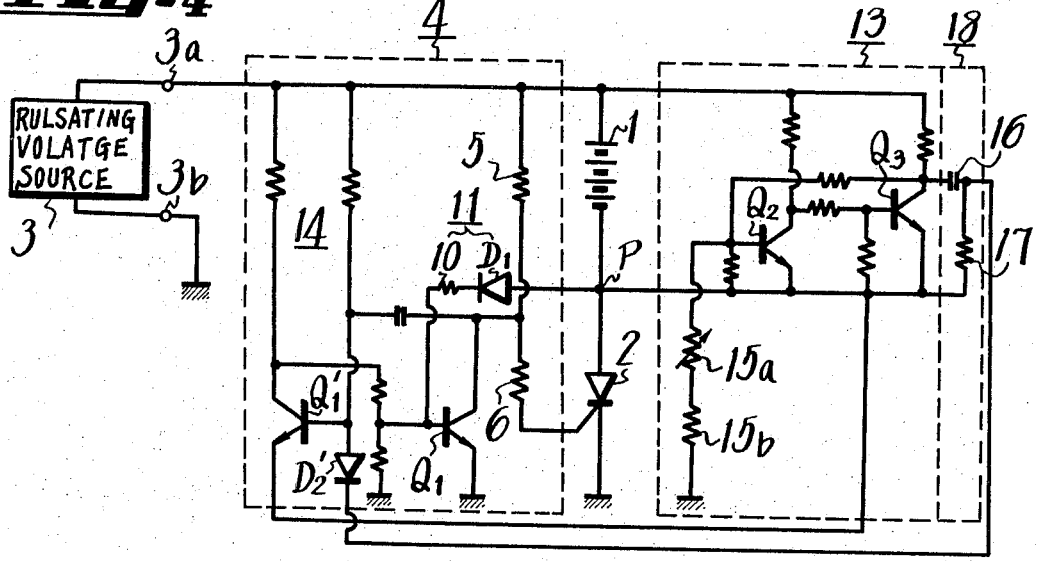
FIG. 4 shows another example of a preferred embodiment of the present invention.

FIG. 4 shows another preferred example of the battery charger of the present invention. In this circuit, the switch control circuit 4 includes the control signal generating circuit shown as 14 in the example of FIG. 2.

The transistor $Q_1$ which serves to control the application of the gating signal to the GCS 2 forms a monostable multivibrator together with a transistor $Q'_1$. The base of the transistor $Q'_1$ is supplied the differentiated output from the differentiating circuit 18 through the diode $D_2$, and the positive pulse having the pulse width $\tau$ is produced at the collector of the transistor $Q'_1$ and supplied to the base of the transistor $Q_1$ to shunt the gating signal for the GCS 2 through the transistor $Q_1$. The other operation is the same as that of the example of FIG. 2 and need not be further described.

In the above described embodiments of the present invention, a SCR is used as a switching device for controlling the charging of the battery to avoid the over-charging. However, it should be understood that other switching device, for example, a diode, bipolar transistor, field effect transistor, etc. and a combination of them may be used instead of the SCR.

As mentioned above, in the battery charger according to the present invention, the open terminal voltage of the battery is detected substantially by detecting the voltage across the switching device connected in series to the battery and compared with a predetermined voltage corresponding to the fully charged voltage of the battery to produce a control signal which indicates that the battery is fully charged, and the switching device is controlled by the control signal to stop the battery charging in order to avoid over-charging, so the whole circuit construction can be simplified.

Further, in the above described embodiments, since the diode $D_1$ is connected between the base of the transistor $Q_1$ and the point P, even in the case that the battery charging is done by any one of several pulsating voltages having different periods, it is not necessary to vary the pulse width $\tau$ of the control signal from the monostable multivibrator in response to the period of the supplied pulsating voltage, if the pulse width $\tau$ is selected less than the width of one wave of the pulsating voltage having minimum period. In case the diode $D_1$ is eliminated, it is necessary to vary the pulse width $\tau$ in response to the period of the supplied pulsating voltage to keep the SCR nonconductive.

We claim as our invention:

1. A battery charger for charging a rechargeable battery comprising a pulsating voltage source, a semiconductor thyristor having an anode-cathode path connected in series with said battery across said pulsating voltage source and having a gate, a thyristor control circuit connected to said gate and having means for rendering said semiconductor thyristor conductive during a portion of each pulse from said voltage source, voltage detecting means including a reference voltage producing means, said voltage detecting means connected to the connecting point between said rechargeable battery and said semiconductor thyristor for detecting the voltage at said connecting point when the pulsating voltage source becomes substantially zero and producing an output when the detected voltage reaches the reference voltage, and means for supplying a control signal in response to the output from said voltage detecting means to said thyristor control circuit to maintain said semiconductor thyristor in a continued non-conductive state, thereby to stop the charging of said rechargeable battery, said thyristor control circuit comprises a resistor connecting said gate to said pulsating voltage source for supplying said pulsating voltage to said gate as a gate signal and switch means connected to said gate for preventing said gate signal from being supplied to said gate when said control signal is supplied to said thyristor control circuit, said switch means having a control terminal supplied with said control signal, and said thyristor control circuit also including a diode connected between the anode of said semiconductor thyristor and the control terminal of said switch means.

2. A battery charger for charging a rechargeable battery comprising a pulsating voltage source, a semiconductor thyristor having an anode-cathode path connected in series with said battery across said pulsating voltage source and having a gate, a thyristor control circuit connected to said gate and having means for rendering said semiconductor thyristor conductive during a portion of each pulse from said voltage source, voltage detecting means including a reference voltage producing means, said voltage detecting means connected to the connecting point between said rechargeable battery and said semiconductor thyristor for detecting the voltage at said connecting point when the pulsating voltage source becomes substantially zero and producing an output when the detected voltage reaches the reference voltage, and means for supplying a control signal in respnse to the output from said voltage detecting means to said thyristor control circuit to maintain said semiconductor thyristor in a continued non-conductive state, thereby to stop the charging of said rechargeable battery, said thyristor comprising a resistor connecting said gate to said pulsating voltage source for supplying said pulsating voltage to said gate as a gate signal and switch means connected to said gate for preventing said gate signal from being supplied to said gate when said control signal is supplied to said thyristor control circuit, said switch means having a control terminal, said thyristor control circuit also including a diode connected between the anode of said semiconductor thyristor and said control terminal of said switch means.

3. A battery charger for charging a rechargeable battery comprising a pulsating voltage source, a semiconductor thyristor having an anode-cathode path connected in series with said battery across said pulsating voltage source and having a gate, a thyristor control circuit connected to said gate and having means for rendering said semiconductor thyristor conductive during a portion of each pulse from said voltage source, voltage detecting means including a reference voltage producing means, said voltage detecting means connected to the connecting point between said rechargeable battery and said semiconductor thyristor for detecting the voltage at said connecting point when the pulsating voltage source becomes substantially zero and producing an output when the detected voltage reaches the reference voltage, and means for supplying a control signal in response to the output from said voltage detecting means to said thyristor control circuit to maintain said semiconductor thyristor in a continued non-conductive state, thereby to stop the charging of said rechargeable battery, said means for supplying a control signal comprising means for generating a pulse having a predetermined width in response to the output of said detecting means and supplying said pulse to said switch means in said switch control circuit, said thyristor control circuit also including a diode connected between the anode of said semiconductor thyristor and the control terminal of said switch means.

4. A battery charger for charging a rechargeable battery comprising a pulsating voltage source, a semiconductor thyristor having an anode-cathode path connected in series with said battery across said pulsating voltage source and having a gate, a thyristor control circuit connected to said gate and having means for rendering said semiconductor thyristor conductive during a portion of each pulse from said voltage source, voltage detecting means including a reference voltage producing means, said voltage detecting means connected to the connecting point between said rechargeable battery and said semiconductor thyristor for detecting the voltage at said connecting point when the pulsating voltage source becomes substantially zero and producing an output when the detected voltage reaches the reference voltage, and means for supplying a control signal in response to the output from said voltage detecting means to said thyristor control circuit to maintain said semiconductor thyristor in a continued non-conductive state, thereby to stop the charging of said rechargeable battery, said means for supplying a control signal comprising means for generating a pulse having a predetermined width in response to the outupt of said detecting means and supplying said pulse to said switch means in said switch control circuit, said thyristor control circuit comprising a resistor connecting said gate to said pulsating voltage source for supplying said pulsating voltage to said gate as a gate signal and switch means connected to said gate for preventing said gate signal from being supplied to said gate when said control signal is supplied to said thyristor control circuit, said switch means having a control terminal supplied with said control signal, said thyristor control circuit also including a diode connected between the anode of said semiconductor thyristor and the control terminal of said switch means.

5. A battery charger for charging a rechargeable battery according to claim 3, in which said voltage detecting means comprises a Schmitt trigger circuit provided with impedance means producing said reference voltage.

6. A battery charger for charging a rechargeable battery according to claim 5, in which said means for supplying a control signal comprises a multivibrator generating a pulse having a predetermined width in response to the output of said Schmitt trigger circuit.

* * * * *